(12) United States Patent
Trench et al.

(10) Patent No.: US 7,720,761 B2
(45) Date of Patent: May 18, 2010

(54) METHOD AND SYSTEM FOR ENHANCING CREDIT LINE MANAGEMENT, PRICE MANAGEMENT AND OTHER DISCRETIONARY LEVELS SETTING FOR FINANCIAL ACCOUNTS

(75) Inventors: Margaret S. Trench, Scotia, NY (US); Shane P. Pederson, Oak Park, IL (US); Tak Wing (Edward) Lau, Needham, MA (US); Lizhi Ma, Newark, DE (US); Hui (Stephanie) Wang, Bear, DE (US); Suresh K. Nair, Storrs, CT (US)

(73) Assignee: JPMorgan Chase Bank, N. A., New York, NY (US)

( * ) Notice: Subject to any disclaimer, the term of this patent is extended or adjusted under 35 U.S.C. 154(b) by 1537 days.

(21) Appl. No.: 10/442,043

(22) Filed: May 21, 2003

(65) Prior Publication Data
US 2004/0111363 A1 Jun. 10, 2004

Related U.S. Application Data

(60) Provisional application No. 60/426,799, filed on Nov. 18, 2002.

(51) Int. Cl.
G06Q 40/00 (2006.01)
(52) U.S. Cl. .............................. 705/42; 705/38; 705/36; 705/35
(58) Field of Classification Search ............. 705/35–44, 705/34
See application file for complete search history.

(56) References Cited

U.S. PATENT DOCUMENTS 4,694,397 A 9/1987 Vignola
4,722,054 A 1/1988 Fukushima
4,745,468 A 5/1988 Von Kohorn
4,774,664 A 9/1988 Gottardy
4,797,911 A 1/1989 Marks
4,914,587 A 4/1990 Clouse
4,926,255 A 5/1990 Von Kohorn
5,121,945 A 6/1992 Thomson
5,179,584 A 1/1993 Tsumura
5,383,113 A 1/1995 Kight et al.
5,715,450 A 2/1998 Ambrose
5,742,775 A 4/1998 King (Continued)

OTHER PUBLICATIONS

Computer Associates Beats Q3 EPS Estimates by $.02; Product Revenue Jumps 13%; EPS Up 31% PR Newswire. New York: Jan. 22, 2001. p. 1.*

(Continued)

Primary Examiner—Frantzy Poinvil
Assistant Examiner—Clement Graham
(74) Attorney, Agent, or Firm—Goodwin Procter LLP

(57) ABSTRACT

A method and system is disclosed for enabling the accurate determination of price points (APRs), credit limits, and other discretionary levels for each cardholder that maximize Net Present Value (NPV) for the portfolio, given constraints on quantities such as risk of default. In accordance with one embodiment, the present invention uses a Markov Decision Process (MDP) methodology to generate a simplified transition matrix representative of the potential state transitions for account holders. This model applies account level historical information on purchases, payments, profitability and delinquency risk to make these decisions. In addition, a data structure is disclosed constructed to implement a transition matrix computationally in different sizes.

29 Claims, 8 Drawing Sheets

U.S. PATENT DOCUMENTS

| | | | |
|---|---|---|---|
| 5,745,706 | A | 4/1998 | Wolfberg |
| 5,758,126 | A | 5/1998 | Daniels |
| 5,832,447 | A | 11/1998 | Rieker |
| 5,835,087 | A | 11/1998 | Herz et al. |
| 6,021,397 | A * | 2/2000 | Jones et al. ............... 705/36 R |
| 2001/0042785 | A1 * | 11/2001 | Walker et al. ............... 235/379 |
| 2002/0091991 | A1 * | 7/2002 | Castro ........................ 717/106 |
| 2002/0188533 | A1 * | 12/2002 | Sanchez et al. ............... 705/30 |
| 2003/0135448 | A1 * | 7/2003 | Aguias et al. ................. 705/38 |
| 2004/0117302 | A1 * | 6/2004 | Weichert et al. .............. 705/40 |
| 2004/0153430 | A1 * | 8/2004 | Sayad ......................... 706/61 |
| 2004/0162773 | A1 * | 8/2004 | Del Rey et al. ............... 705/36 |

OTHER PUBLICATIONS

Harold Bierman, JR et al., "The credit granting decision," Management Science, vol. 16, No. 8, Apr. 1970, pp. B-519-B532.

Yvo M. I. Dirickx‡ et al., "An extension of the bierman-hausman model for credit granting," Management Science, vol. 22, No. 11, Jul. 1976.

L.C. Thomas et al., "Credit scoring and credit control," Clarendon Press, Oxford, 1992, pp. 257-276.

Penny Lunt, "What boosts card usage?," Marketing Exchange, ABA Banking Journal, Jul. 1992, pp. 82-85.

Suresh K. Nair, "Modeling strategic investment decisions under sequential technological change," Management Science, vol. 41, No. 2, Feb. 1995, pp. 282-297.

Suresh K. Nair et al., An application of yield management for internet service providers Naval Research Logistics, vol. 48 (2001), pp. 348-362.

Eric Rosenberg et al., Quantitative methods in credit management: a survey operations Research, vol. 42, No. 4, Jul.-Aug. 1994, pp. 589-613.

Dilip Soman et al., "The effect of credit on spending decisions: the role of the credit limit and credibility," Marketing Science, vol. 21, No. 1, Winter 2002, pp. 32-53.

Karl-Heinz Waldmann, "On granting credit in a random environment," Mathematical Methods of Operations Research (1998) 47:99-115.

Intelligent CallRouter™, "Delivering the right information to the right resource for every customer interaction," 1 page, (1999).

Computer Telephony Solutions, "The Customer Interaction Specialists," 1 page, May 25, 1999.

Punch, L., "The latest anti-attrition tool: more credit," Credit Card Mnangement, vol. 5, No. 5, pp. 48-51.

* cited by examiner

| Transition | From | To |
|---|---|---|
| 1 | 12 | 11 |
| 2 | 13 | 12 |
| 3 | 12 | 11 |
| 4 | 23 | 12 |
| 5 | 11 | 13 |
| 6 | 22 | 23 |
| 7 | 23 | 21 |
| 8 | 21 | 23 |
| 9 | 11 | 23 |
| 10 | 21 | 22 |

(a)

| From | To | | | | | |
|---|---|---|---|---|---|---|
| | 11 | 12 | 13 | 21 | 22 | 23 |
| 11 | 0 | 0 | 0.5 | 0 | 0 | 0.5 |
| 12 | 1 | 0 | 0 | 0 | 0 | 0 |
| 13 | 0 | 1 | 0 | 0 | 0 | 0 |
| 21 | 0 | 0 | 0 | 0 | 0.5 | 0.5 |
| 22 | 0 | 0 | 0 | 0 | 0 | 1 |
| 23 | 0 | 0.5 | 0 | 0.5 | 0 | 0 |

Transition matrix (b)

FIG. 3

| Transition | From | To (Beh) |
|---|---|---|
| 1 | 12 | 1 |
| 2 | 13 | 2 |
| 3 | 12 | 1 |
| 5 | 11 | 3 |
| 6 | 22 | 3 |
| 7 | 23 | 1 |
| 8 | 21 | 3 |
| 10 | 21 | 2 |

(a)

| From | To (Behavior) | | |
|---|---|---|---|
| | 1 | 2 | 3 |
| 11 | 0 | 0 | 1 |
| 12 | 1 | 0 | 0 |
| 13 | 0 | 1 | 0 |
| 21 | 0 | 0.5 | 0.5 |
| 22 | 0 | 0 | 1 |
| 23 | 1 | 0 | 0 |

Transition Matrix (b)

FIG. 4

| State | State Definition ||||||| Optimal Action |
|---|---|---|---|---|---|---|---|---|
| | Line | APR | Beh1 | Beh2 | Beh3 | Beh4 | Beh5 | Beh6 | |
| 1 | 1 | 1 | 1 | 1 | 1 | 1 | 1 | 1 | No action |
| 2 | 1 | 1 | 1 | 1 | 1 | 1 | 1 | 2 | No action |
| 3 | 1 | 1 | 1 | 1 | 1 | 1 | 1 | 1 | Increase line $1,000 |
| 4 | 1 | 1 | 1 | 1 | 1 | 1 | 1 | 2 | No action |
| 5 | 1 | 1 | 1 | 1 | 1 | 1 | 2 | 1 | Increase APR by 2.5% |
| 6 | 1 | 1 | 1 | 1 | 1 | 1 | 2 | 2 | No action |
| 7 | 1 | 1 | 1 | 1 | 1 | 1 | 2 | 1 | Increase line $3,000 |
| 8 | 1 | 1 | 1 | 1 | 1 | 2 | 2 | 2 | No action |
| 9 | 1 | 1 | 1 | 1 | 1 | 2 | 1 | 1 | No action |
| ... | ... | ... | ... | ... | ... | ... | ... | ... | ... |
| 14000 | 10 | 5 | 4 | 4 | 3 | 3 | 2 | 2 | Decrease APR by 2.5% |

FIG. 8

| Credit Line Intervals | | APR Intervals | |
|---|---|---|---|
| 1 | $0-2,000 | 1 | <10% |
| 2 | $2,000-5,000 | 2 | 10-15% |
| 3 | $5,000-7,500 | 3 | 15-17.5% |
| 4 | $7,500-10,000 | 4 | 17.5-20% |
| 5 | $10,000-12,000 | 5 | >20% |
| 6 | $12,000-14,000 | | |
| 7 | $14,000-16,000 | | |
| 8 | $16,000-18,000 | | |
| 9 | $18,000-20,000 | | |
| 10 | >$20,000 | | |

FIG. 9

METHOD AND SYSTEM FOR ENHANCING CREDIT LINE MANAGEMENT, PRICE MANAGEMENT AND OTHER DISCRETIONARY LEVELS SETTING FOR FINANCIAL ACCOUNTS

CROSS-REFERENCE TO RELATED APPLICATIONS

This patent application claims priority to U.S. Provisional Patent Application No. 60/426,799, filed Nov. 18, 2002, which is hereby incorporated by reference herein in its entirety.

BACKGROUND OF THE INVENTION

This present invention relates generally to the field of financial modeling and more particularly to methods and systems for constructing and implementing such models to manage characteristics of a financial account portfolio, such as a credit card portfolio, and for use in retail banking, brokerage and insurance accounts in an effective manner.

Relating specifically to the bankcard industry, it is well known that annual percentage rate (APR) and available credit line of an account are critical factors influencing card usage and, subsequently, bank profitability. Similarly brokerage fees, retail banking loan rates, and yearly insurance re-pricing influence profitability in those industries. In the credit card industry, lower APRs and higher credit lines are more attractive to consumers. However, APRs that are too low may reduce bank profitability, while indiscriminate line increases may adversely affect risk management such as by dramatically increasing credit loss exposure.

Balance accumulation and customer retention are important goals for bankcard issuers, there are two broad approaches to achieve this objective are: take unilateral action to influence the desired behavior (i.e., increased card usage), and take measures that require initial customer response before the desired behavior results. Measures such as APR credit line and fee adjustments and other pricing changes generally fall in the first category. The second category generally consists of measures such as mailing convenience checks, balance transfer checks and monthly statement checks, each of which requires the customer to make the decision to respond to the offer before the benefits to the bank accrue. Because the unilateral approach lacks a direct response, it may not be readily apparent that a unilateral action results in a desired behavior at all and/or it may prove difficult to detect or measure. For example, though there is anecdotal evidence that line increases may spur increased card usage, there may be countervailing evidence that many account holders simply ignore line increases. While the effect of pricing changes is often perceived to have the greatest impact on driving customer behavior, because most price changes increase the APR, called re-pricing, the resulting effect is often to reduce card usage. Because the unilateral approach may be fully implemented controlled and monitored by the issuing bank, accurate modeling methods in this regard have substantial value.

Although there are some known modeling methods for granting initial credit, significantly fewer solutions exist regarding the management of existing credit lines and pricing. In one known methodology, statistical models are developed using a Bayesian approach and a Markov decision model to make the initial credit granting decision. However, little research has been published that relates to adjusting the base price of card products once issued. Of more immediate relevance to the present invention is the decision to periodically change credit limits and pricing. Credit limit increases for existing cardholders may be used as a tactical marketing tool and are routinely made to increase card usage. Increasing credit limits does, has been found to influence increased spending among certain consumers. However, it has also been found that the more savvy consumers are not as readily affected by credit limit increases. Additionally, it is believed that some customers who pay their bills in full each month may be completely insensitive to the base APR of their product. Alternatively, pricing a card competitively can lead to increased sales and usage by those customers who are price sensitive.

Adding to the issue is the fact that the above understandings have traditionally been studied in conjunction with the effects of credit limit changes for a customer with a single card. Since each modern customer typically has an average of 4.2 cards, the more interesting effects relate to seeing if charges may be shifted from one to another due to a line increase, even if the level of total debt for a cardholder does not change, an effect known as balance migration. Since card issuers typically see only activity on their card, and the various credit bureaus only provide aggregate data over all bankcard balances, it is often difficult to differentiate between new activity and balance migration.

Conventionally, processes exist for making line management decisions, but do not include policies for reducing customer base APRs. One conventional approach for line change decisions that is common in the credit card industry is known as a decision tree analysis. In this approach, a portfolio is segmented by models that predict a customer's future risk, profitability and likelihood of discontinuing card usage, or attrition. Customer credit bureaus and internal card usage information are also commonly used to define various segments. These variables measure payment, sales, bankcard revolving balances, delinquency history, and so on. The models or scores and variables are grouped into intervals. The inverted decision tree starts from a root variable and has as many levels as the variables being used. At each level the tree branches into each interval of that variable, and at the bottom of the tree the leaf nodes specify the amount of credit line increase to be given. An example decision rule may be "If the current credit line is $2000, and balance is $1500, then if the risk score is 650, give a line increase of $1000, for risk scores between 600 and 650, give a line increase of $750, etc." There are a number of commercial rule engines available to deploy these decision criteria. Examples of such rule engines include products from ILOG (JRules Version 4.0) and Fair Isaac and Co. (TRIAD version 7.0).

In general, existing decision tree methodology for line change or management has been in place for many years. Some variables invalid in the decision tree are credit bureau scores on risk, revenue, etc. Although these proprietary models are considered to be fairly accurate in projecting the future earnings and losses of a customer, they may not be considered sufficient in evaluating customer spending, usage and payment under different pricing and line change scenarios. For example, these models used information on usage and payment over all cards and other debts (auto, mortgage, etc.) that a cardholder has to predict delinquency and future profitability. However, this information alone is not considered sufficient in evaluating usage resulting from additional line amounts or reductions in APR. The known decision tree methodologies are also geared more towards using current account behavior (such as utilization of current line) and is not capable of considering or predicting future account behavior that may result from a change in line or price.

Additionally, at many card issuing institutions, line change decisions are evaluated for each account periodically or every so often, e.g., every few months or more frequently if necessary. In addition, ad hoc line increases may be given in in-store situations where the cardholder bumps against their current limit and would otherwise not be able to make a large ticket purchase. Line increases are also evaluated as results of a specific customer request to inbound call centers.

Limitations associated with prior business practices present important opportunities for improvements in the treatment of customers, operational difficulties and lost savings. First, credit lines and pricing are highly visible to customers and result in a highly competitive business environment. Our goals is to offer a line and/or pricing change consistent with the needs and utility that a customer would derive from such actions while minimizing risk. Shortcomings in stimulating sales and balance growth from a customer base may well affect financial performance. From a risk management perspective, the amount of incremental net credit loss incurred for the amount of line that a bank or card issuer gives its customers is disproportionately large. Data suggests that lines are more than competitive with the marketplace but that dollars charged off relative to outstanding balances are high. Second, pricing changes are conventionally triggered by late payments. A customer's APR may be increased based on failure to make timely payment(s). Often, once the APR is raised, it does not automatically decrease based on subsequent customer behavior. Pricing models are focused on pricing at the time of acquisitions or pricing of convenience checks.

Accordingly, there is a clear need in the area of predictive financial modeling for a method and system for accurately enabling credit line management and price management according to a customer's inherent needs and also incorporating any business rules consistent with the issuing bank's own business constraints regarding risk and return.

SUMMARY OF THE INVENTION

The present invention overcomes the problems noted above, and provides additional advantages, by providing a method and system for enabling the accurate determination of price points, credit limits or lines, and other discretionary levels associated with cardholders or other customers. The inventive method and system may be used to maximize Net Present Value (NPV) for a card issuer's portfolio in consideration of concerns such as risk of default. Furthermore, the present invention may be used to improve a bankcard issuer's profit while balancing the dual criteria of growth and contained losses. In accordance with one embodiment, the present invention uses a Markov Decision Process (MDP) methodology or model to generate a simplified transition matrix representative of the potential state transitions for account holders. This model applies, for example, account level historical information on purchases, payments, profitability and delinquency risk to make these decisions.

To achieve these advantages and in accordance with a purpose of an embodiment of the present invention, as embodied and broadly described herein, a method for managing financial accounts comprises the steps of collecting account data for a plurality of financial accounts, where the account data are associated with a plurality of variables; establishing at least one control variable and at least one behavior variable based on the plurality of variables; determining a plurality of interval breakpoints for the at least one control variable and the at least one behavior variable; defining a plurality of account states based at least in part on the at least one control variable, the at least one behavior variable and the plurality of interval breakpoints; forming a transition matrix based at least in part on the account data and the plurality of account states; generating a Markov Decision Process (MDP) model based at least in part on the transition matrix; and using the Markov Decision Process model to effect a change in the at least one control variable resulting in a desired effect on the plurality of account states.

According to another embodiment of the present invention, a computer readable medium having code for causing a processor to manage financial accounts comprises code adapted to collect account data for a plurality of financial accounts, where the account data are associated with a plurality of variables; code adapted to establish at least one control variable and at least one behavior variable based on the plurality of variables; code adapted to determine a plurality of interval breakpoints for the at least one control variable and the at least one behavior variable; code adapted to define a plurality of account states based at least in part on the at least one control variable, the at least one behavior variable and the plurality of interval breakpoints; code adapted to form a transition matrix based at least in part on the account data and the plurality of account states; code adapted to generate a Markov Decision Process (MDP) model based at least in part on the transition matrix; and code adapted to use the Markov Decision Process model to effect a change in the at least one control variable resulting in a desired effect on the plurality of account states.

According to yet another embodiment of the present invention, a system for managing financial accounts comprises a data collection module for collecting account data for a plurality of financial accounts, where the account data are associated with a plurality of variables; an establishment module for establishing at least one control variable and at least one behavior variable based on the plurality of variables; a determination module for determining a plurality of interval breakpoints for the at least one control variable and the at least one behavior variable; a definition module for defining a plurality of account states based at least in part on the at least one control variable, the at least one behavior variable and the plurality of interval breakpoints; a formation module for forming a transition matrix based at least in part on the account data and the plurality of account states; a generation module for generating a Markov Decision Process (MDP) model based at least in part on the transition matrix; and a decision module for using the Markov Decision Process model to effect a change in the at least one control variable resulting in a desired effect on the plurality of account states.

According to yet another embodiment of the present invention, a system for managing financial accounts comprises means for collecting account data for a plurality of financial accounts, where the account data are associated with a plurality of variables; means for establishing at least one control variable and at least one behavior variable based on the plurality of variables; means for determining a plurality of interval breakpoints for the at least one control variable and the at least one behavior variable; means for defining a plurality of account states based at least in part on the at least one control variable, the at least one behavior variable and the plurality of interval breakpoints; means for forming a transition matrix based at least in part on the account data and the plurality of account states; means for generating a Markov Decision Process (MDP) model based at least in part on the transition matrix; and means for using the Markov Decision Process model to effect a change in the at least one control variable resulting in a desired effect on each of the plurality of account states.

One embodiment of the present invention also provides a data-structure construct that is flexible in creating transition matrices of different sizes and levels of sparsity. For example, a transition matrix can be implemented using simple rectangular arrays. However, data sparsity may result in a rectangular array containing a large number of "0" elements. Out of consideration for memory and resource usage, the present invention may incorporate a bi-directional linked list and tree structure for the implementation of the methodology. This approach may be useful in the specific requirements of the control-behavioral state combinations. In addition, each state also contains important financial metrics and simulation statistics, and these cannot be easily encapsulated in a state by means of a simple rectangular array data structure. The data structure may be generic to most programming languages available in the computer industry.

BRIEF DESCRIPTION OF THE DRAWINGS

The present invention can be understood more completely by reading the following Detailed Description of exemplary embodiments, in conjunction with the accompanying drawings, in which:

FIG. 3 includes an exemplary transition table and associated transition matrix in non-simplified format.

FIG. 4 includes an exemplary transition table and associated transition matrix in simplified format.

FIG. 8 includes an exemplary policy lookup table in accordance with one embodiment of the present invention.

FIG. 9 includes a table illustrating exemplary sets of breakpoint intervals in accordance with an embodiment of the present invention.

DETAILED DESCRIPTION OF THE PREFERRED EMBODIMENTS

A Markov Decision Process (MDP) based approach enables future behavior modeling by way of a transition matrix, a very effective and accurate method for modeling behavior. Unfortunately, an impediment to the widespread commercial use of this methodology is the so-called curse of dimensionality (i.e., the problem size increases exponentially with the number of variables included). The present invention addresses and solves this problem, thereby enabling the effective use of a MDP-based approach. The model of the present invention is hereinafter referred to as the Portfolio Control and Optimization model.

Figure 1:
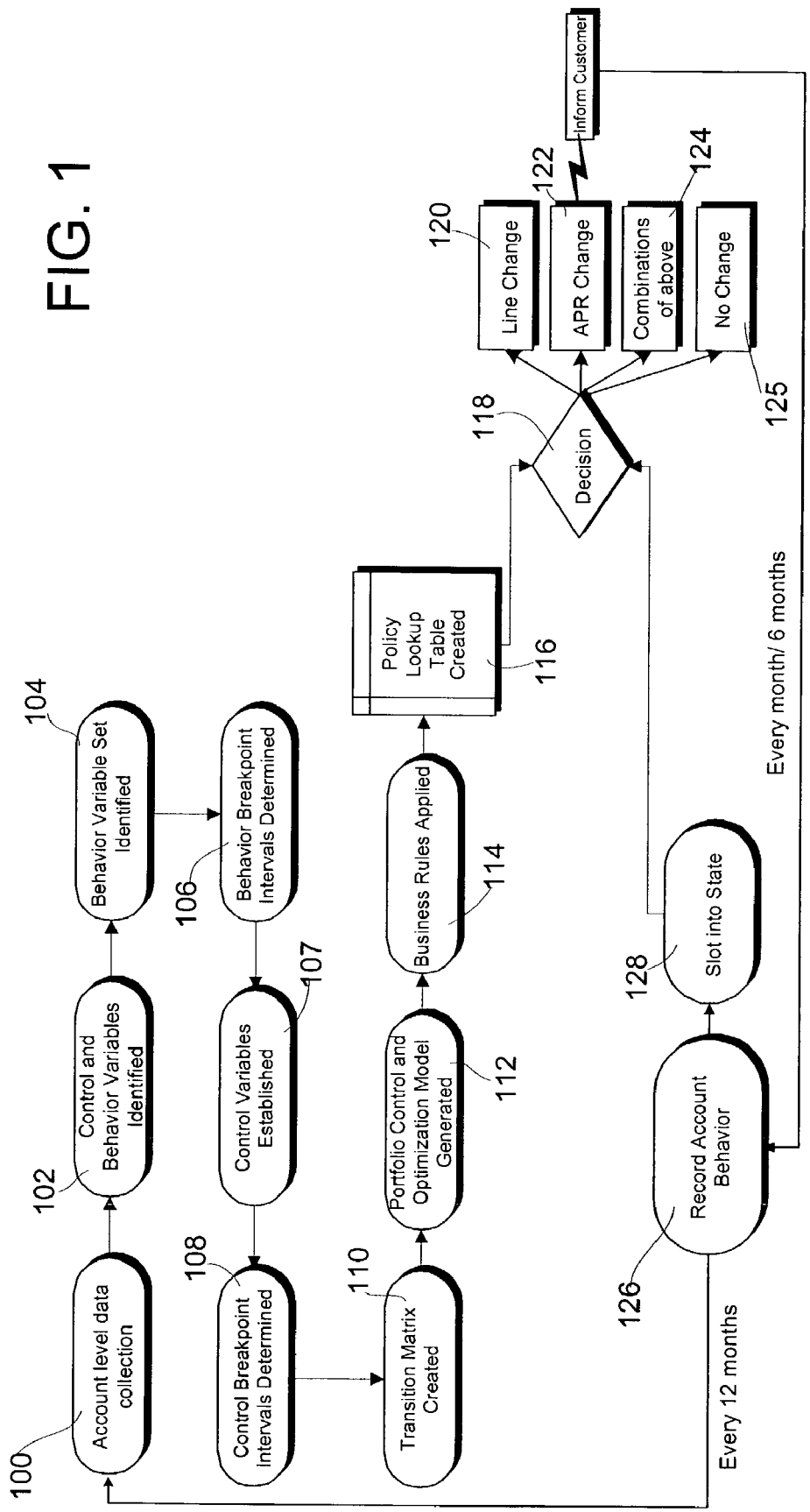
FIG. 1 is a flow diagram illustrating one embodiment of a method for formulating and implementing the Portfolio Control and Optimization model of the present invention.

Referring now to FIG. 1, there is shown a flow diagram illustrating one embodiment of a method for formulating and implementing the Portfolio Control and Optimization model of the present invention. Initially, in step 100, time-series data for each of a plurality of credit accounts is collected on a number of variables that may eventually be included within the MDP model. In one embodiment, such variables may include: credit bureau variables; credit bureau scores; (e.g., predicting customer risk, revenue, bankruptcy, response to new offers, etc.), and account performance data (e.g., monthly purchases, cash advances, payments, balances, net cash flows (NCF), credit losses, credit line, delinquency status, APR, response to convenience checks, etc.).

Next, in step 102, the listing of variables is separated into control variables (those that the bank controls, such as credit limit and APR), and behavior variables (most of the rest, which the cardholder dictates or influences). Next, a regression tree analysis is done to select a set of behavior variables that were most predictive of profitability, e.g. as measured by NCF in step 104. In one embodiment, the resulting set includes six behavior variables that span the main dimensions of customer behavior (e.g. risk, card use, revolving activity, purchases and payments etc.).

The next step is to determine interval breakpoints for each of these variables in step 106. In one construct, four breakpoint intervals are created for two of the variables, three breakpoint intervals are created for another two variables and two breakpoint intervals are created for the final two variables. In this embodiment, the breakpoint intervals are decided based upon one or more of the regression tree analysis results, characteristic distributions and statistical quality pertaining to cell sizes and sparsity. According to some embodiments of the present invention, the interval breakpoints for a level may be bounded on purpose. For example, customers with very high credit lines may be grouped together in the topmost range and may not be allowed any further increases in their credit lines. In accordance with an embodiment of the present invention, the groupings of the control variables may be based on business factors more than on data.

Since a goal of the present model is to manage both credit lines and pricing, credit limit and APR may be established as the two control variables in step 107. However, it should be appreciated that the present invention may also be applied to manage one variable at a time, i.e. in a stand-alone manner. Breakpoint intervals may be based on the step size of change to be given to customers in terms of credit lines and pricing. In one example as illustrated in FIG. 9, ten breakpoint intervals are set for the credit limit variable and five breakpoint intervals are set for the APR variable in step 108.

Figure 2:
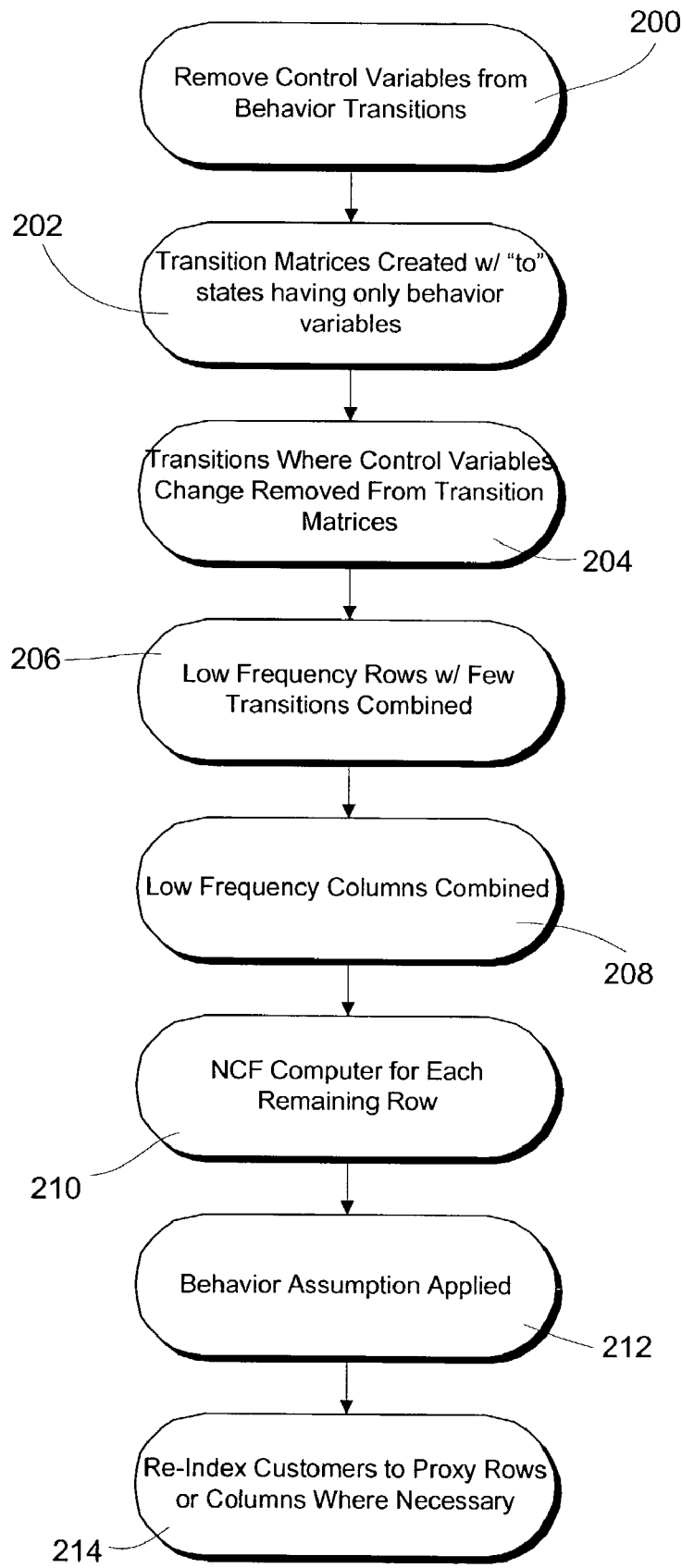
FIG. 2 is a flow diagram illustrating one embodiment of a method for simplifying a MDP transition matrix.

Using the collected data as well as various assumptions and simplification techniques described in additional detail below, a simplified transition matrix is formed in step 110. FIG. 2 is a flow diagram representing one embodiment of the transition matrix formation step 110.

In this exemplary embodiment, a complete set of eight variables (two control variables and six behavior variables) collectively represents the state in which an account can be slotted into in any month of the time series data. For example, an account in month June may be in state (13;112312), meaning that it is in the first interval of credit limit, the third interval of APR, the first interval of behavior variables 1 and 2, the second interval of behavior variable 3, the third interval of behavior variable 4, the first interval of behavior variable 5, and the second interval of behavior variable 6 (the semicolon separates the control variables from the behavior variables). One example of a state transition would be a move to state (14; 421322) in the next month, July. Since the collected data of this example included 18 months of data for each account, 17 state transitions may be observed for each account.

According to an embodiment of the present invention, it may be desirable to verify that the states defined by the set of variables satisfy the Markovian assumption, which is the basis for using an MDP model. The Markovian assumption is that the transitions from a state in one period to another in the next period are path independent. Path independence means that the probability of moving from state x to state y depends only on x, regardless of which states and actions preceded the move to state x. If this assumption is unrealistic given the way the state is defined, one way to accommodate the assumption is to redefine the state such that it carries some (finite) history with it. One way to do this, for example, is by concatenating the states in two successive periods to define a new state. For example, the state x may be defined as ux and vx, depending on whether the account got to x from u or from v. However, this approach may increase the state space considerably. Another way to reduce the likelihood of violating the assumption of path independence is to identify variables that carry some history. For example, most card issuers segment their customers as revolvers (those who carry balances), transactors (those who pay off the whole amount every month), and inactives (those who are not using the card). Most accounts are stable in these segments over several months, and by choosing the segment as one of the behavior variables, the state transitions may be more likely to be path independent. According to an embodiment of the invention, some other variables such as three-month averages may be chosen to incorporate some history and reduce the volatility in the values observed.

Since the representative sampling in this example included data regarding three million accounts, 51 million transitions would need to be examined to include each account. Traditionally, information from each of these transitions would be used to create the transition matrices of the present invention. As briefly described above, transition matrices are used in MDP models to describe how entities (accounts in this example) move from one state to another in the model from period to period (months in this example). Transition matrices are rectangular matrices with the number of rows and columns corresponding to the number of states in the system. The entries in the transition matrix are mathematically denoted by $p(j|s)$ which corresponds to the probability p of the account transitioning from state s in a period to state j in the next period. Since each account has to transition to one of the available states in the next period (including the originating state), the sum of each row in the transition matrix is 1.

By way of explanation, a typical transition matrix formation may be illustrated by constructing a transition matrix for a simple case having only two state variables, one of which is a control variable which can take two levels, and the other being a behavior variable, which can take three levels. For the ten possible transitions shown in FIG. 3(a), a transition matrix can be created, as shown in FIG. 3(b).

In one embodiment of the present invention a model has two control or decision variables with 10 and 5 levels respectively, and six behavior variables with 4, 4, 3, 3, 2 and 2 levels respectively. Using the above described procedure would result in a massive transition matrix having a size of 10*5*4*4*3*3*2*2=28,800 rows as well as a large number of columns. Further, transition matrix formation of this nature, separate transition matrices need to be established for each discrete action. In this embodiment, potential actions include credit line increases, credit line decreases, price increases, price decreases, no line changes, and no price changes, that would amount to nine different transition matrices of 28,800 rows and columns each. The 51 million transitions available from the exemplary data set are not enough to fully populate such a large transition matrix, resulting in transition matrices that are very sparse.

Accordingly, in step 200, the first simplification is made to remove control variable changes from behavior transitions, since the control variable changes reflect actions by the bank and not by the account holder. Further, control variable changes typically are much less frequent than behavior variable changes. However, it would not be prudent to ignore control variables completely, because the behavior of a person with a credit line of $10,000 could be quite different from that of a person with a credit limit of $2,000, all other behavior variables being at the same levels in both cases.

In step 202, transition matrices are created wherein the "from" states in the transition matrix include both control and behavior variables, while the "to" states contain only behavior variables. In step 204, transitions in which control variables change are removed from the matrices significantly reducing the number of cells. FIG. 4(b) shows the creation of such a transition matrix using the same data as in FIG. 3. Note that the control variable changes in transitions 4 and 9 in FIG. 3, and have thus been removed from consideration in FIG. 4(b). The corresponding listing of included transitions is also shown in FIG. 4(a).

As can be seen from the examples shown in FIGS. 3 and 4, instead of the original 36 cells in the transition matrix shown in FIG. 3(b), now there are only 18 cells in the matrix of FIG. 4(b). Returning to the model of the exemplary embodiment, the number of original cells (28,800*28,800=829.44 million) would reduce to (28,800*576=16.6 million), a 50 fold reduction.

The next simplification step is the combination of low frequency rows that had very few transitions to adjoining rows using a simple greedy heuristic in step 206. This reduces the number of rows to less than 14,000. A similar exercise for the columns in step 208 reduces the columns to about 200, requiring the population of approximately 2 million cells. For each of these 14,000 rows the average Net Cash Flow (NCF) of being in that row was computed from the data in step 210. According to an embodiment of the present invention, various components of NCF or profitability that are important in the card issuer's decisions.

Typical MDP methodology would require the creation of transition matrices for each kind of action to be considered in the model. This would imply that in the MDP model when a change action is taken, the behavior would be derived from that transition matrix. When no change is being considered the behavior would be derived from a "do nothing" transition matrix. In the present context this would mean that the effect of the change would be felt only in the period of the change (say once in six months), and in other periods the "do nothing" transition matrix would be used.

Typically the effect of a line increase may take a few periods to drive changes in customer behavior. Thus using a different transition matrix created from data only pertaining to the periods where such changes were made in the past may be unrepresentative. In the exemplary embodiment the assumption is made in step 212 that the behavior of an account that was given a line increase (say from Line 1 to 3) becomes identical to the accounts that have higher lines (in this case Line 3) but the same behavior variable levels. For example, referring to the example of FIG. 4(b), if an account is in state 13 and the control variable was increased from 1 to 2, then from the next period the account would transition as if the account were in state 23 (the control variable changes, but the behavior variable stays the same).

This assumption simplifies the model considerably because it is no longer necessary to have separate transition matrices for each action. Rather, all that was necessary was to re-index to another row (corresponding to the action) and proceed to transitioning as before. This approach works for changes in both directions, increases and decreases, for both line and price. One limitation to this simplification exists at the boundary (the highest and lowest levels of the variables). No change is possible, since one cannot re-index to a level beyond the boundary levels.

Another consideration is that in certain rare situations re-indexing would move a customer to a non-existent row or column, since combining them with others had already eliminated many low frequency rows and columns. In such cases, a simple greedy heuristic is used to re-index these entries instead to a proximate row or column in step 214. This process is complicated by proximity in this embodiment where there are 8 dimensions (one for each variable) and many rows or columns may appear close to the one that is needed after re-indexing based on closeness to different variable levels—some may be close on one variable but far on others, whereas others may be the opposite. Decisions need to be made regarding which of these rows to choose as a proxy for the missing row.

Returning now to FIG. 1, once the above simplifications have been used to generate the transition matrix, the Portfolio Control and Optimization model is generated in step 112. The objective of the Portfolio Control and Optimization model is to create a set of actions that maximize or enhance the expected future profits (i.e., the Net Present Value, NPV) of the portfolio subject to transitioning dynamics. This can be formulated as the following homogeneous MDP model that can be solved recursively for a particular time horizon:

$$V_t(s) = \max_{a \in A_s} \left\{ r(s_a) + \beta \sum_{j \in S} p(j|s_a) V_{t+1}(j) \right\}$$

where $V_t(s)$ is the optimal discounted NPV in state s and time t, $A_s$ is the set of actions a available in state s, $r(s_a)$ is the Net Cash Flow (NCF) in state s when offset (as explained before) for the action a taken, $\beta$ is the one period discount factor, and $p(j|s_a)$ is the transition probability that specifies the likelihood of moving to state j from the (offset) state $s_a$, and S is the set of all states. In one embodiment of the present invention, the model may be limited to only 1-step and 2-step jumps in either direction. The following is a more detailed description of such a model:

States: At each time period, t, the system occupies a state defined by s=(x,y), where x is a set of control variables and y is a set of behavior variables. Let the highest values in x be denoted by x" and the lowest values by x'.

Actions: In each state (x,y), the set of actions A (x,y) consists of some or all of the
following actions
1. Do nothing, $a_i$=0.
2. Increase $x_i$ to $\min(x_i+a_i, x_i")$, that is, an increase cannot take the system to a state higher than the maximum allowable.
3. Decrease $x_i$ to $\max(x_i-a_i, x_i')$ that is, a decrease cannot take the system to a state lower than the minimum allowable.

Limited to only 1-step and 2-step jumps in either direction.

Rewards: In each state (x,y), a net cash flow of r(x,y) is received. These could be positive or negative. In charge-off states, the reward will be negative. This would also be true in the inactive states.

Transition Matrices: The transitions from state to state are represented by a transition matrix P, with elements p(x,y;j), where columns j correspond to behavior states only and $$\sum_{j \in S} p(x, y; j) = 1 \text{ for each state } (x, y).$$

Since the transition matrix models transitions every month, but credit line and pricing updates may only be made periodically, the recursive functional equation for the Portfolio Control and Optimization model may be described as:

$$V_t(x, y) = \begin{cases} \max_{a_i \in A(x,y)} r(x \pm a_i, y) + \beta \sum_{j \in S} p(x \pm a_i, y; j) V_{t+1}(x \pm a_i, j) & \text{if } t = \text{update epoch} \\ r(x, y) + \beta \sum_{j \in S} p(x, y; j) V_{t+1}(x, j) & \text{otherwise} \end{cases}$$

$$V_T(x, y) = r(x, y)$$

That is, in months where no line change or price change occurs ("update months"), no action is taken and the transition matrix is used to model transitions of the system into states in the next period. During decision epochs, actions are evaluated by re-indexing the control variable part of the state definition and the transition matrix. In the above model, T is the time horizon for which the model is solved; at which point the terminal rewards are collected as stated above. $\beta$ is the one period discount factor.

Similar to many optimization problems, there are constraints to be considered in setting up the present model. In this embodiment, constraints include business rules including, for example, not giving line increases to customers at risk of defaulting in the future (e.g., those with risk scores below a certain threshold), etc. Since it is difficult to incorporate constraints in an MDP approach, the present embodiment incorporates such constraints using a "back end" approach. Accordingly, in step 114 of FIG. 1, the optimal solutions produced by the Portfolio Control and Optimization model may be subjected to business rules constraints for implementation in a campaign. These may include limiting the percentage of accounts to be treated by an action (credit line change and/or APR change) so as to agree with a campaign budget, and not treating those accounts whose risk profile is unfavorable.

The output of the Portfolio Control and Optimization model is a policy that prescribes the optimal line and/or price changes (including "Do nothing") for each of the 14,000 states in our model. Instead of solving this model in real time, the present invention contemplates creating an easy to use lookup table, an example of which is shown in FIG. 8, in step 116 that would prescribe an action for each of the states.

Once the table has been created, a decision may be made in step 118 regarding whether to give a given cardholder a line change, a rate change, no changes, or any combination of these. Corresponding actions may be taken out in steps 120, 122, 124 and 125.

Regarding the adaptive aspect of the present invention, in one embodiment, the process also records cardholder account behavior in step 126 and scores each cardholder periodically to slot them in one of our behavior states in step 128. Once this is done, the policy table specifies the optimal action that needs to be taken in response to customer actions. In the long term, the transition matrix and NCF information for each state is preferably recreated every twelve months or so, as the economy or bank practices change.

Figure 5:
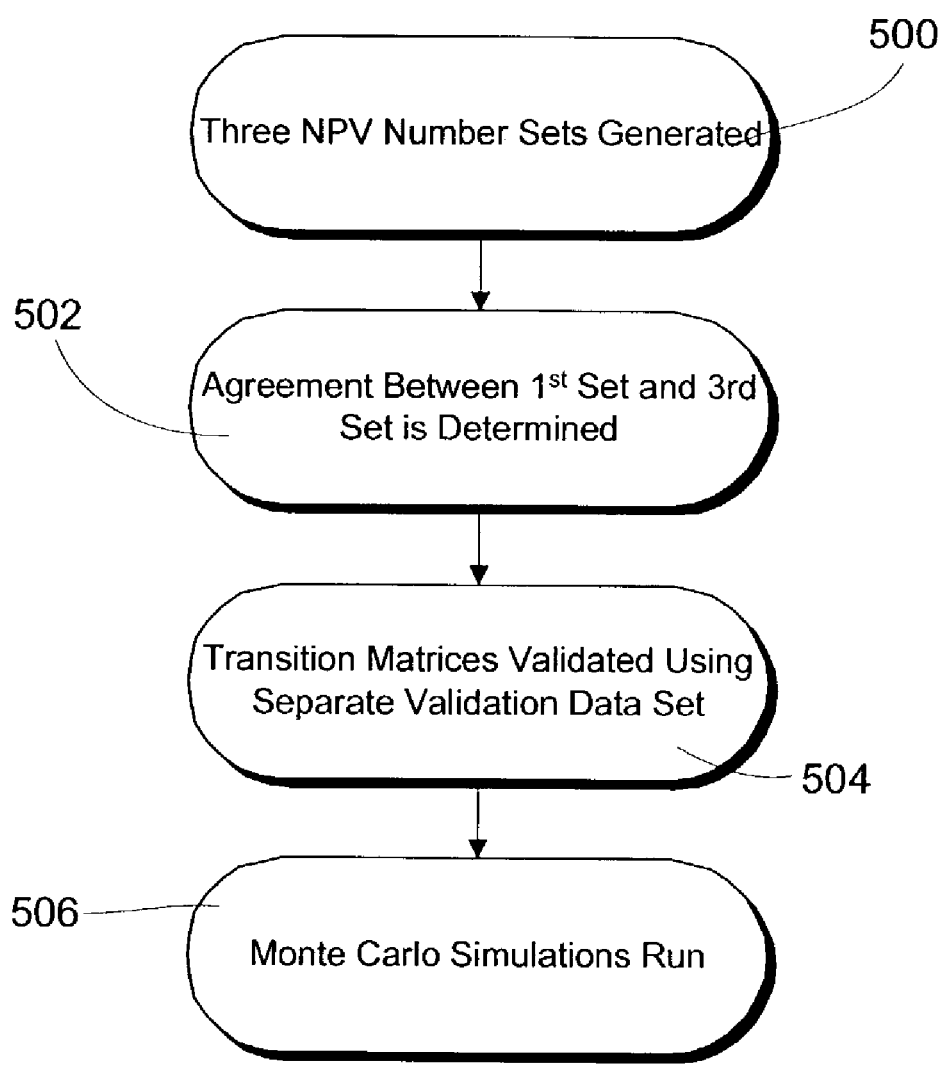
FIG. 5 is a flow diagram illustrating one embodiment of a method for testing the applicability of the Portfolio Control and Optimization model.

Referring now to FIG. 5, there is shown a flow diagram illustrating one method for testing the applicability of the Portfolio Control and Optimization model the creation of which is described in detail above. Initially, in step 500, three sets of numbers are generated: a first set relating to the NPV from the time series data for the 3 million accounts of this example; a second set relating to the NPV from the Portfolio Control and Optimization model; and a third set relating to the NPV from using only the "do nothing" action in each state of the Portfolio Control and Optimization model. Agreement between the first and third number sets is determined in step 502. It can be seen that an agreement between the first and third sets of numbers would verify that the transition matrix was correctly generated and that the assumptions underlying the simplification of the rectangular transition matrix and the action independent transition matrix were appropriate. In the present embodiment, it was determined that the difference in these two sets of numbers was not significant. A 12.5% improvement in NPV was identified by using the portfolio control and optimization model over the time series data.

Next, in step 504, the transition matrices are validated by using a separate validation data set and comparing the NCFs and delinquencies, etc., generated by taking the "do nothing" decision in each state of the MDP using the original transition matrix and the time series generated by the validation data set. Through this analysis, the robustness of the present model on a different sample can be seen. Additionally, this analysis also confirmed that the portfolio control and optimization model was accurate in projecting key profitability components such as outstanding balances and net credit losses.

The next step 506 is to run Monte Carlo simulations to obtain the distribution of NPV from using the portfolio control and optimization model. The MDP model only gives the average NPV, and does not give a sense of the dispersion of the number around the mean. Since financial services firms are concerned about risk, this lack of information on dispersion presents an issue.

Figure 6:
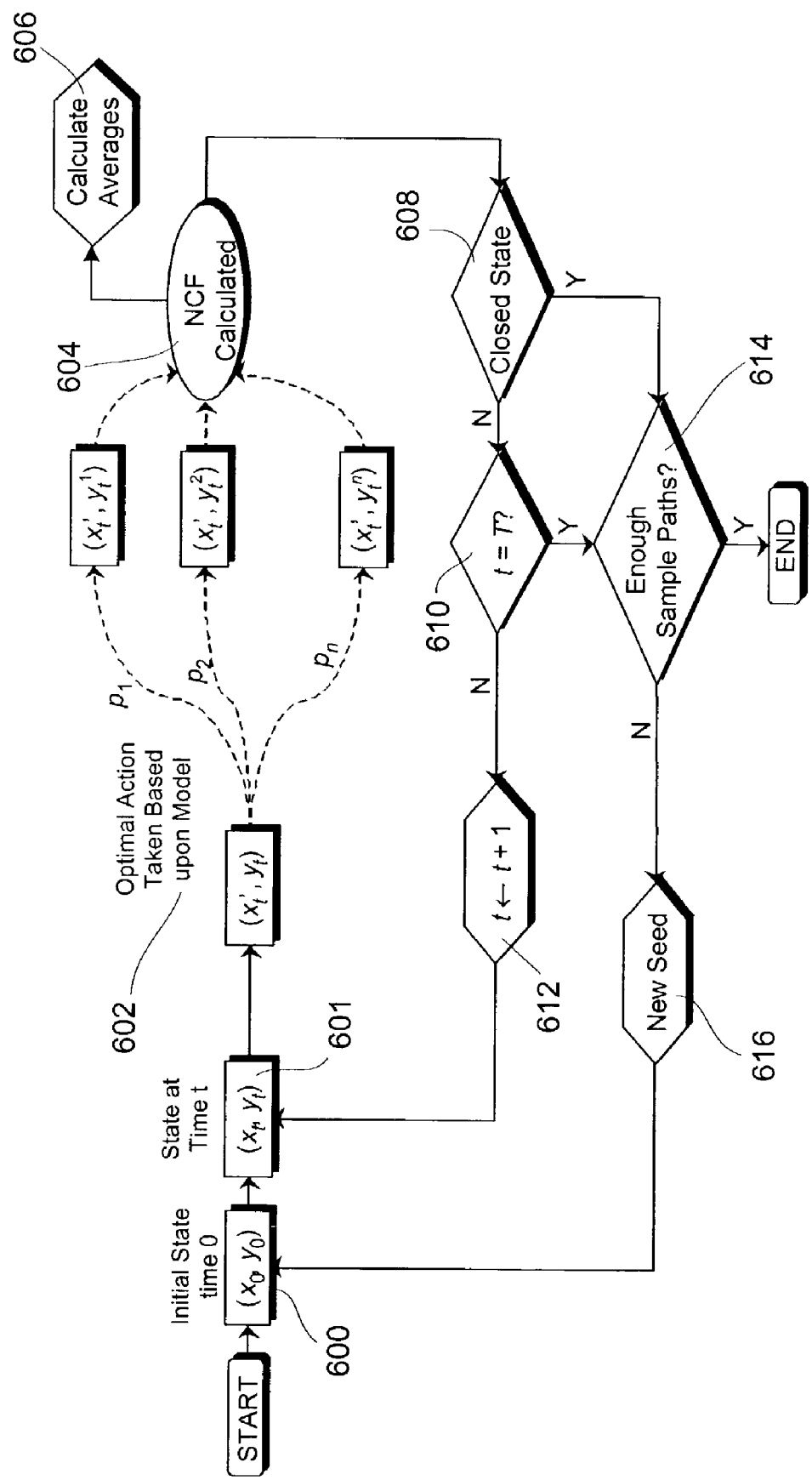
FIG. 6 is a flow diagram illustrating one embodiment of a method for validating the portfolio control and optimization model using Monte Carlo simulations.

Monte Carlo simulations can provide this information. Turning now to FIG. 6, there is shown a flow diagram illustrating one embodiment of a method for validating the portfolio control and optimization model using Monte Carlo simulations. In this embodiment, Monte Carlo simulations are conducted using processes generated by the portfolio control and optimization model in each state and running for a period of 36 months, for example. This is done by initially starting in each of the 14,000 states in step 600 which becomes the initial $(x_t, y_t)$ in step 601. Next, the accounts are permitted to randomly transit from state to state using the transition matrix, and in review periods take the desired action as specified by the portfolio control and optimization model (a line change, price change, a combination, or do nothing) in step 602. For each period the NCF is collected for being in that state in step 604. These values are discounted back to the starting time period to obtain the NPV in step 606.

Once the data is collected, at step 608 it is determined, whether the state is closed. If not, it is determined in step 610 whether all 36 months for the given initial state have been completed. If all 36 months of the simulation have not been completed, the time is iterated in step 612 and the process returns to step 601 for the new time t. If all 36 months of simulation have been completed or if it is a closed state this is considered a complete sample path. It is next determined in step 614 whether enough sample paths have been simulated (10,000 in the current scenario). If not, a new state seed is generated in step 616 and the process returns to step 600 for the new initial state. The overall NPV is obtained by conditioning on the probability of starting from each state, which is known from the data set.

Figure 7:
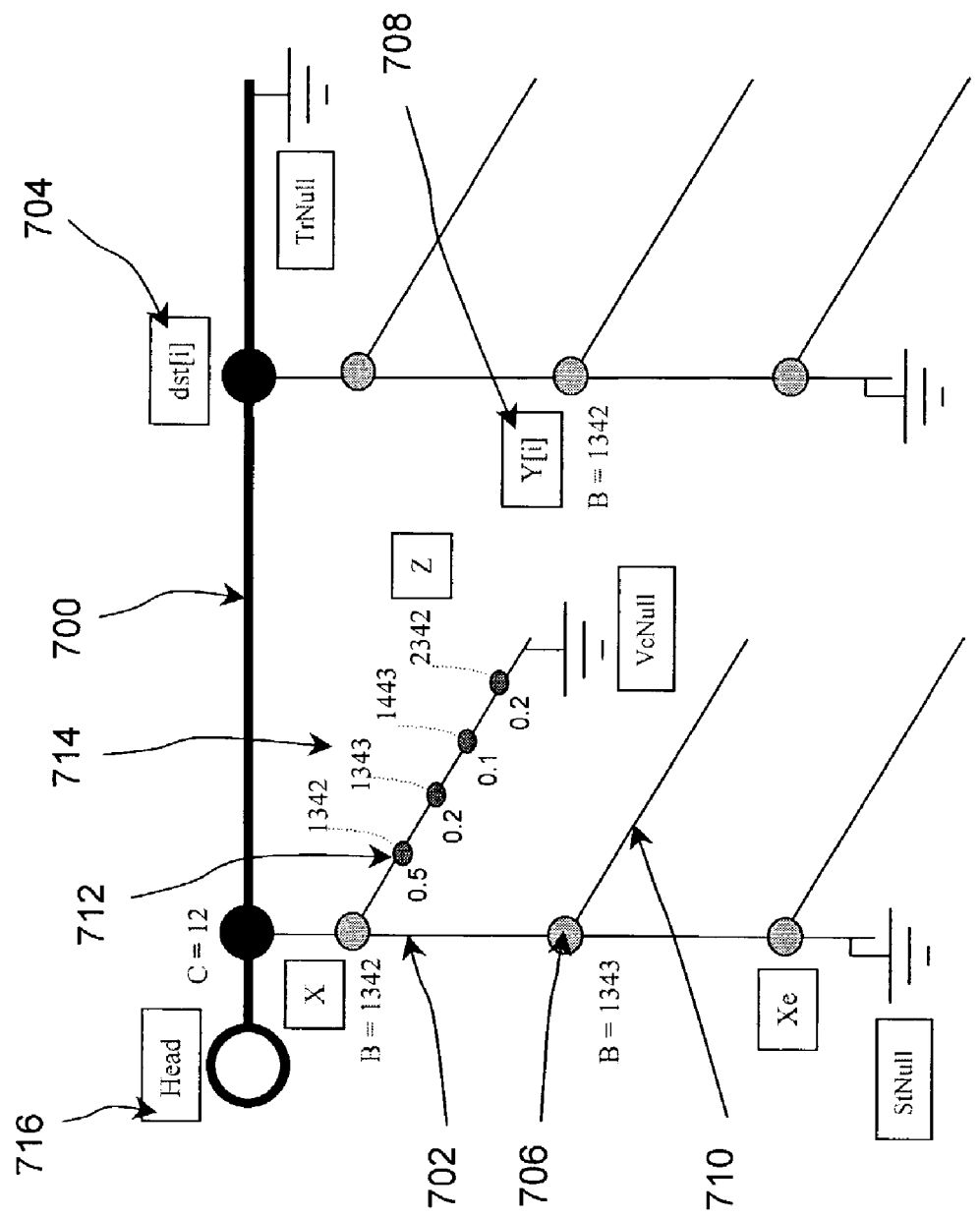
FIG. 7 is a tree diagram illustrating one embodiment of a data structure for creating transition tables in different sizes.

Referring now to FIG. 7, there is shown a data structure constructed to implement a transition matrix computationally in different sizes. More particularly, the data structure of FIG. 7 incorporates the methodology of an embodiment of the present invention in a manner consistent with many potential programming languages and should not be limited to any particular programming language. Each "transition matrix" tree may have the following components: a control branch 700, a behavior node 706 and a transition probability node 712.

Regarding the Control Branch of type TreeS (700), its null pointer is explicitly typed TrNull. Each control branch 700 is a member of a bi-directional linked list that contains the following elements: control variable C; a bi-directional linked list (702) of all behavioral state nodes, with X as the beginning node and Xe as the ending node; and an array of action specific destinations (704) of a control variable dst[ ].

Regarding the Behavior Node of type State (706), its null pointer may be explicitly typed StNull. Each behavior node 706 may be a member of a bi-directional linked list that contains one or more of the following elements: the behavioral state variable B; arrays of financial metrics and simulation statistics (not shown in the diagram); an array Y[ ] of action specific destinations (708) of the behavioral variable; and a bi-directional linked list (710) of all behavioral transitions.

Regarding the Transition Probability Node of type VProb (712), its null pointer may be explicitly typed VcNull. Each transition probability node may be a member of a bi-directional linked list that contains the following elements: the destination behavioral state variables (also denoted as B); a list of destination pointers Z (714) of destination behavior nodes that have non-zero transition probabilities; and a list of transition probability values of all destination points (and these values sum to 1).

The entire "transition matrix" tree may begin with the root location, e.g., called Head of type TreeS (716). One may traverse the tree back and forth using all bi-directional links. However, it is designed to have points such as Y[ ] and Z to help accessing the tree more directly and efficiently.

By providing a usable methodology for predicting customer response to both credit line and price adjustments, the present invention enables issuing institutions to more effectively manage credit lines and pricing on its accounts, with a goal towards maximizing card usage while keeping business risks in mind.

According to embodiments of the present invention, the portfolio control and optimization model may be revised to apply to customers who have affinity-card products (e.g. airline reward cards). The methodology in accordance with the present invention may also be applied to customers who have multiple relationships with one financial entity (e.g. customers who have banking accounts, credit card accounts and investment accounts with a same bank). According to an embodiment of the present invention, the Markov Decision Process may be implemented in conjunction with integer programming to incorporate business rules constraints more directly into the portfolio control and optimization model.

According to an embodiment of the present invention, the portfolio control and optimization model and methodology may be implemented on computer(s) or a computer-based network. The method as exemplarily illustrated in the drawings and described above, may be programmed into a computer software that is encoded onto computer readable media, such as floppy disks, hard disks, compact disks and flash memory devices. The computer software may be run on a general-purpose or specialized computer or computer-based network to cause the computer or computer-based network to perform the encoded functions.

Other embodiments, uses and advantages of the present invention will be apparent to those skilled in the art from consideration of the specification and practice of the present invention disclosed herein.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A computer implemented method for managing financial accounts by changing at least one control variable including at least one of a credit line and an annual percentage rate, the method comprising the steps of:
    collecting and storing in one or more storage devices account data for a plurality of financial accounts, where the account data are associated with a plurality of variables;
    establishing at least one control variable and at least one behavior variable based on the plurality of variables;
    determining by a data processor, a plurality of interval breakpoints for the at least one control variable and the at least one behavior variable;
    defining a plurality of account states based on the at least one control variable, the at least one behavior variable and the plurality of interval breakpoints;
    forming a transition matrix based at least in part on the account data and the plurality of account states;
    generating a Markov Decision Process (MDP) model based at least in part on the transition matrix;
    using the Markov Decision Process model to determine a change in the at least one control variable resulting in a desired effect on the plurality of account states; and
    changing at least one of the credit line and the annual percentage rate for the financial accounts based on the determined change.

2. The method according to claim 1, where the account data comprise time-series data on a least one of:
    (a) credit bureau variables;
    (b) credit bureau scores; and
    (c) financial account performance.

3. The method according to claim 1, here the desired effect is associated with at least one of the financial accounts':
    (a) net cash flow (NCF);
    (b) balance migration; or
    (c) risk of credit losses.

4. The method according to claim 1, further comprising the steps of:
    performing a regression tree analysis on the plurality of variables;
    establishing the at least one behavior variable based on the regression tree analysis; and
    determining the plurality of interval breakpoints for each of the at least one behavior variable based on the regression tree analysis.

5. the method according to claim 1, further comprising the steps of
    applying business rules to an output of the Markov Decision Process model; and
    generating a policy lookup table based on the business rules and the output of the Markov Decision Process model.

6. The method according to claim 1, further comprising simplifying the transition matrix based on one or more of the following techniques:
    (a) creating a rectangular transition matrix with rows for the at least one control variable and the at least one behavioral variable, and columns for the at least one behavior variable only;
    (b) combining at least one row of a transition matrix with an adjoining row, where the at least one row is characterized with low-frequency transitions;
    (c) combining at least one column of a transition matrix with an adjoining column, where the at least one column is characterized with low-frequency transitions; and
    (d) re-indexing a transition matrix to correctly capture all past and future account transitions.

7. The method according to claim 1, further comprising validating and supplementing the output of the Markov Decision Process model through a Monte Carlo simulation, where the Monte Carlo simulation is based at least partially on the account data.

8. The method of claim 1, wherein a Portfolio Control and Optimization model is represented as:

$$V_t(x, y) = \begin{cases} \max_{a_i \in A(x,y)} r(x \pm a_i, y) + \beta \sum_{j \in S} p(x \pm a_i, y; j) V_{t+1}(x \pm a_i, j) & \text{if } t = \text{update epoch} \\ r(x, y) + \beta \sum_{j \in S} p(x, y; j) V_{t+1}(x, j) & \text{otherwise} \end{cases}$$

$$V_T(x, y) = r(x, y)$$

wherein,

V_t(x, y) is the optimal discounted Net Present Value (NPV) in state (x,y) and time t;

A(x, y) is a set of actions $a_i$ available in state (x,y);

r(x,y) is the Net Cash Flow (NCF) in state (x,y);

r(x±$a_i$, y) is the Net Cash Flow (NCF) in state (x,y) when offset for the action $a_i$ taken;

β is a one period discount factor;

p(x±$a_i$, y; j) is the transition probability that specifies the likelihood of moving to state j from the state (x±$a_i$,y);

S is the set of all states; and

T is the time horizon for which the model is solved.

9. A computer readable medium for causing a processor to manage financial accounts by changing at least one control variable including at least one of a credit line and an annual percentage rate, the computer readable medium comprising one or more instructions for performing the following:

collecting account data for a plurality of financial accounts, where the account data are associated with a plurality of variables;

establishing the at least one control variable and at least one behavior variable based on the plurality of variables;

determining a plurality of interval breakpoints for the at least one control variable and the at least one behavior variable;

defining a plurality of account states based at least in part on the at least one control variable, the at least one behavior variable and the plurality of interval breakpoints;

forming a transition matrix based at least in part on the account data and the plurality of account states;

generating a Markov Decision Process (MDP) model based at least in part on the transition matrix;

using the Markov Decision Process model to determine a change in the at least one control variable resulting in a desired effect on the plurality of account states; and changing at least one of the credit line and the annual percentage rate for the financial accounts based on the determined change.

10. The computer readable medium according to claim 9, where the account data comprise time-series data on at least one of:
(a) credit bureau variables;
(b) credit bureau scores; and
(c) financial account performance.

11. The computer readable medium according to claim 9, where the desired effect is associated with at least one of the financial accounts':
(a) net cash flow (NCF);
(b) balance migration; or
(c) risk of credit losses.

12. The computer readable medium according to claim 9, further comprising instructions for:

performing a regression tree analysis on the plurality of variables;

establishing the at least one behavior variable based on the regression tree analysis; and determining the plurality of interval breakpoints for each of the at least one behavior variable based on the regression tree analysis.

13. The computer readable medium according to claim 9, further comprising instructions for:

applying business rules to an output of the Markov Decision Process model; and generating a policy lookup table based on the business rules and the output of the Markov Decision Process model.

14. The computer readable medium according to claim 9, further comprising at least one instruction for simplifying the transition matrix comprising one or more of the following:

(a) creating a rectangular transition matrix with rows for the at least one control variable and the at least one behavior variable, and columns for the at least one behavior variable only;

(b) combining at least one row of a transition matrix with an adjoining row, where the at least one row is characterized with low frequency transitions;

(c) combining at least one column of a transition matrix with an adjoining column, where the at least one column is characterized with low-frequency transitions; and (d) re-indexing a transition matrix to correctly capture all past and future account transitions.

15. The computer readable medium according to claim 9, further comprising an instruction for validating and supplementing the output of the Markov Decision Process model through a Monte Carlo simulation, where the Monte Carlo simulation is based at least partially on the account data.

16. A computer implemented system for managing financial accounts by changing at least one control variable including at least one of a credit line and an annual percentage rate, the method, the system comprising a data collection module for collecting account data for a plurality of financial accounts, where the account data are associated with a plurality of variables;

an establishment module for establishing the at least one control variable and at least one behavior variable based on the plurality of variables;

a determination module for determining a plurality of interval breakpoints for the at least one control variable and the at least one behavior variable;

a definition module for defining a plurality of account states based at least in part on the at least one control variable, the at least one behavior variable and the plurality of interval breakpoints;

a formation module for forming a transition matrix based at least in part on the account data and the plurality of account states;

a generation module for generating a Markov Decision Process (MDP) model based at least in part on the transition matrix; and a decision module for using the Markov Decision Process model to determine a change in the at least one control variable resulting in a desired effect on each of the plurality of account states and for changing at least one of the credit line and the annual percentage rate for the financial accounts based on the determined change.

17. The system according to claim 16, where the account data comprise time-series data on at least one of:
(a) credit bureau variables;
(b) credit bureau scores; and
(c) financial account performance.

18. The system according to claim 16, where the desired effect is associated with at least one of the financial accounts':
(a) net cash flow (NCF);
(b) balance migration; or
(c) risk of credit losses.

19. the system according to claim 16, further comprising:

an analysis module for performing a regression tree analysis on the plurality of variables;

an establishment module for establishing the at least one behavior variable based on the regression tree analysis; and a determination module for determining the plurality of interval breakpoints for each of the at least one behavior variable based on the regression tree analysis.

20. The system according to claim 16, further comprising:
a rule module for applying business rules to an output of the Markov Decision Process model; and
a generation module for generating a policy lookup table based on the business rules and output of the Markov Decision Process model.

21. The system according to claim 16, further comprising a simplification module for simplifying the transition matrix based on one or more of the following techniques:
(a) creating a rectangular transition matrix with row for the at least one control variable and the at least one behavior variable, and columns For the at least one behavior variable only;
(b) combining at least one row of a transition matrix with an adjoining row, where the at least one row is characterized with low-frequency transitions;
(c) combining at least one column of a transition matrix with an adjoining column, where the at least one column is characterized with low-frequency transitions; and
(d) re-indexing a transition matrix to correctly capture all past and future account transitions.

22. The system according to claim 16, further comprising a simulation module for validating and supplementing the output of the Markov Decision Process model through a Monte Carlo simulation, where the Monte Carlo simulation is based at least partially on the account data.

23. A computer implemented system for managing financial accounts by changing at least one control variable including at least one of a credit line and an annual percentage rate, the system comprising:
means for collecting account data for a plurality of financial accounts, where the account data are associated with a plurality of variables;
means for establishing the at least one control variable and at least one behavior variable based at least in part on the plurality of variables;
means for determining a plurality of interval breakpoints for the at least one control variable and the at least one behavior variable;
means for defining a plurality of account states based at least in part on the at least one control variable, the at least one behavior variable and the plurality of interval breakpoints;
means for forming a transition matrix based at least in part on the account data and the plurality of accounts states;
means for generating a Markov Decision Process (MDP) model based at least in part on the transition matrix;
means for using the Markov Decision Process model to determine a change in the at least one control variable resulting in desired effect on each of the plurality of account states; and
means for changing at least one of the credit line and the annual percentage rate for the financial accounts based on the determined change.

24. The system according to claim 23, where the account data comprising time-series data on at least one of:
(a) credit bureau variables;
(b) credit bureau scores; and
(c) financial account performance.

25. The system according to claim 23, where the desired effect is associated with at least one of the financial accounts:
(a) net cash flow (NCF);
(b) balance migration; or
(c) risk of credit losses.

26. The system according to claim 23, further comprising:
means for performing a regression tree analysis on the plurality of variables;
means for establishing the at least one behavior variable based on the regression tree analysis; and
means for determining the plurality of interval breakpoints for each of the at least one behavior variable based on the regression tree analysis.

27. The system according to claim 23, further comprising:
means for applying business rules to an output of the Markov Decision Process model; and
means for generating a policy lookup table based on the business rules and the output of the Markov Decision Process model.

28. The system according to claim 23, further comprising means for simplifying the transition matrix based on one or more of the following techniques:
(a) creating a rectangular transition matrix with rows for the at least one control variable and the at least one behavior variable, and columns for the at least one behavior variable only;
(b) combining at least one row of a transition matrix with an adjoining row, where the at least one row is characterized with low-frequency transitions;
(c) combining at least one column of a transition matrix with an adjoining column, where the at least one column is characterized with low-frequency transitions; and
(d) re-indexing a transition matrix to correctly capture all past and future account transitions.

29. The system according to claim 23, further comprising means for validating and supplementing the output of the Markov Decision Process model through a Monte Carlo simulation, where the Monte Carlo simulation is based at least partially on the account data.

* * * * *